Oct. 17, 1967  A. J. BORDEN  3,347,455
LIQUID EXTRACTOR SYSTEM
Filed March 16, 1965  2 Sheets-Sheet 1

INVENTOR
ALEC J. BORDEN
BY Roy A. Plant
ATTORNEY

Oct. 17, 1967  A. J. BORDEN  3,347,455
LIQUID EXTRACTOR SYSTEM
Filed March 16, 1965  2 Sheets-Sheet 2

INVENTOR
ALEC J. BORDEN
BY Roy A. Plant
ATTORNEY

United States Patent Office 3,347,455
Patented Oct. 17, 1967

3,347,455
LIQUID EXTRACTOR SYSTEM
Alec J. Borden, R.R. 1, Augusta, Mich. 49012
Filed Mar. 16, 1965, Ser. No. 440,109
9 Claims. (Cl. 233—19)

The present invention relates broadly to an extractor system, and in its specific applications to a system for extracting various portions of butterfat from raw milk to produce a required quality of processed milk.

In the dairy industry, milk produced on the dairy farms is normally loaded in tank wagons for delivery to a creamery processing plant. At the creamery the milk goes through a processing cycle which is accomplished by pumping the raw milk from the tank wagon into a receiving tank for later processing, or by pumping the raw milk directly from the tank wagon into the processing system. During the processing cycle the percent of butterfat in the raw milk must be determined so that the milk can be processed to meet the minimum butterfat percentage standards set up by the various governmental units.

The raw milk passes through a clarifier-standardizer which cleans the milk by removing the foreign matter present in the raw milk. The clarifier-standardizer standardizes the milk by extracting cream from the raw milk. This process can provide various products, such as cream, material to be used as background for cottage cheese, standard milk, and skim milk. The milk, before bottling, will be passed through a pasteurizer.

One example of a processing cycle is to determine the percent of butterfat in the raw milk in the receiving tank. The raw milk is then pumped through the clarifier-standardizer, which requires the cream extractor to be adjusted, by trial and error, to extract a certain portion of cream from the raw milk to produce processed milk having at least the minimum required butterfat percentage. The processing cycle could also be operated by directly running the tank wagon load of raw milk through the clarifier-standardizer and extracting the required portion of cream.

Both these examples provide, in one operation, for the extracting of cream from raw milk thereby producing processed raw milk having the minimum required butterfat percentage. These processing cycles have the disadvantage of requiring a different manual setup for the clarifier-standardizer for each raw milk storage source run such as a tank wagon load or receiving tank load. They also require a continuous run off of the cream to a cream receiver which usually is of a small volume. This causes many problems such as critical adjustment, changing flow rate because of churning of the cream under some conditions, for example. These and other factors limit and change the volume flow and thereby hamper the reliability of the processing cycles.

Accordingly, among the objects of the present invention is to provide a processing system having an extractor to remove a portion of a material as a by-product from a supplied product by permitting a periodic large flow of the by-product to be extracted and produce a processed product having a minimum required percentage of the extracted material.

Another object is to provide a system which is easily adaptable to units presently in the field and can be used to remove various amounts of butterfat from a volume of milk without readjusting the clarifier-standardizer.

A further object is to provide a processing system which can accurately operate over a broad range of raw milk butterfat percentages to produce processed milk meeting a minimum butterfat percentage requirement.

A further object is to provide a processing system which has a timer unit which can be set to open and close the cream outlet of a clarifier-standardizer for specific portions of a time period.

Another object of the present invention is to provide a continuous bleed off means permitting a portion of the cream to pass to the processed raw milk outlet from the clarifier-standardizer where a churning effect may occur.

Also, an object of the present invention includes the provision of a liquid extractor system having a construction capable of accomplishing the above objectives with a minimum of material cost and fabricating expense, and at the same time being composed of simple and ruggedly formed structures which are very reliable in application.

Still further objects and advantages of the present invention will appear as the description proceeds.

To the accomplishment of the foregoing and related ends, the invention, then, consists of means hereinafter fully described and particularly pointed out in the claims, the annexed drawings and the following description setting forth in detail certain means for carrying out the invention. Such disclosed means illustrating, however, but one of various ways in which the principle of the invention may be used.

Figure 1:
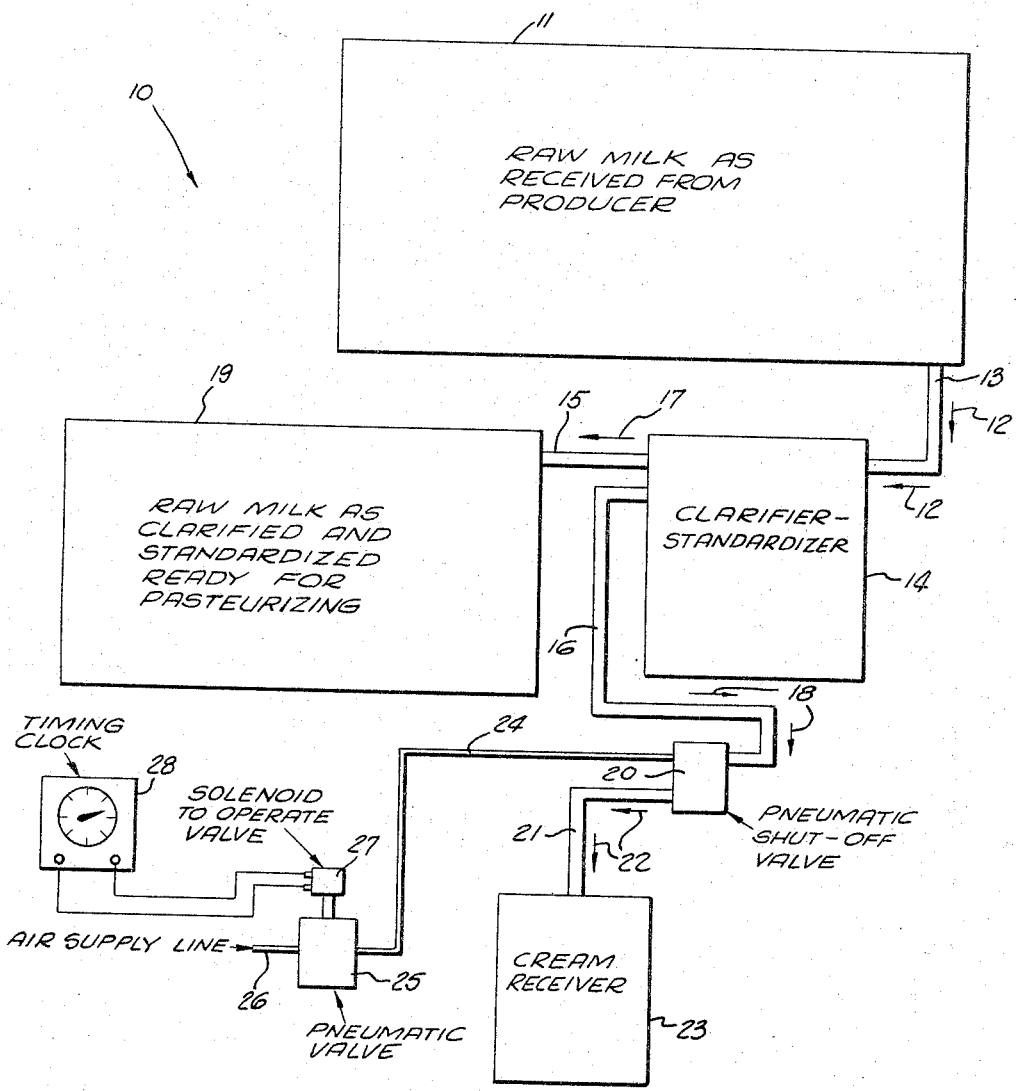
FIGURE 1 is a schematic layout showing a raw milk processing system.

Referring generally to FIGURE 1, there is shown a schematic layout of a processing system indicated as number 10. A block 11 represents raw milk as it is received from the dairy farmer. This milk is referred to as raw milk as received from the producer. The block 11 could represent either milk in tank wagons or milk in receiving tanks. The milk passes from the block 11 in the direction shown by arrows 12 through conduit 13 to block 14, representating the clarifier-standardizer unit. The raw milk coming from block 11 through conduit 13 can either leave block 14 through conduit 15 or conduit 16 as indicated by arrows 17 and 18, respectively. The milk passing through conduit 15 goes to block 19 which represents the raw milk having been processed and the minimum required amount of butterfat percentage. This processed milk as clarified and standardized is ready for pasteurizing. The portion of the cream from the raw milk received by the clarifier-standardizer moves from the block 14 through conduit 16, as indicated by arrows 18, through the pneumatic shut-off valve 20 on through conduit 21 as indicated by arrows 22 to a cream receiver indicated as block 23.

The pneumatic shut-off valve 20 has a pneumatic conduit line 24 running from a pneumatic valve 25. The pneumatic valve 25 receives air from an air supply line 26 and its open and closed positions are controlled by a solenoid valve 27. The solenoid valve 27 is connected to and controlled by a timing clock 28 to control the opening and closing of the pneumatic shut-off valve 20 upon signal. The functioning and purpose of operation between the timing clock 28 and a pneumatic valve 20 and their associated elements will be explained more fully below.

Figure 2:
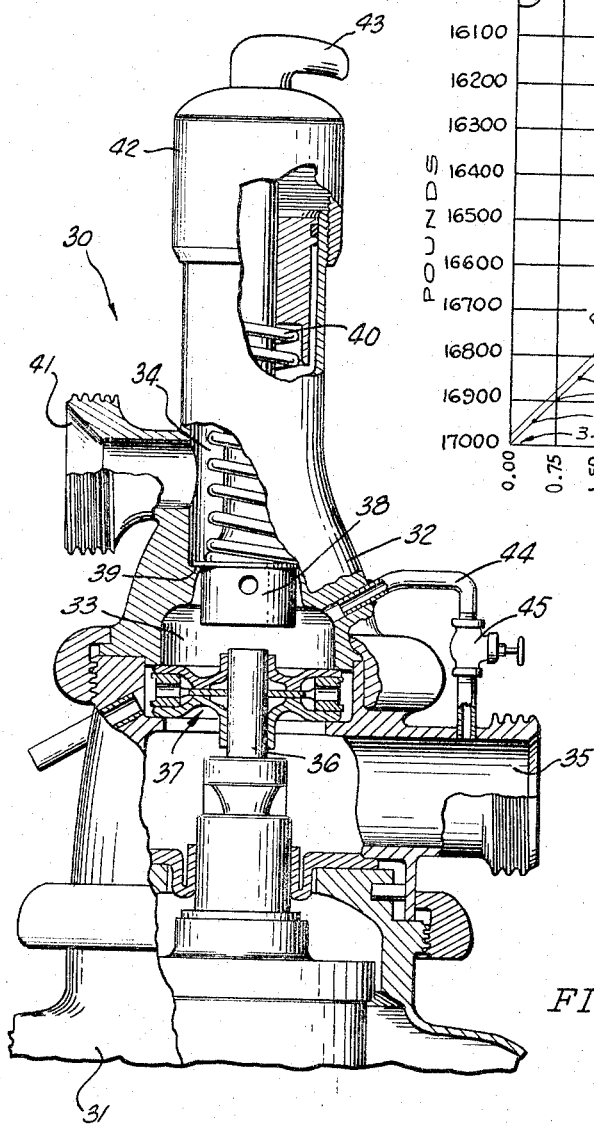
FIGURE 2 is a partial sectional view showing the cream extractor end of a typical clarifier-standardizer unit.

Referring generally to FIGURE 2, we have the cream extractor head 30 of a typical clarifier-standardizer unit represented as block 14 in FIGURE 1. The body portion 31 has a cap member assembly 32 secured to it. The cap member assembly 32 can be connected to the body portion 31 in various ways, well known in the art. Cap member 32 has an inner cream chamber 33 and an outer cream chamber 34. The processed milk will pass from the body portion 31 through milk outlet 35, which will deliver the milk to conduit 15 of FIGURE 1, not shown in FIGURE 2. The cream is delivered through a shaft assembly 36 to the inner cream chamber 33 and is separated from the body portion 31 by body seal 37. As the cream arrives in inner chamber 33, the cream pressure will open valve 38, which is held in normally closed position by spring 40, unseating valve 38 from valve seat 39. This permits the cream to pass from the inner chamber 33 through the valve 39 to outer cream chamber 34 and on out through a cream outlet 41 which delivers the cream through conduit 16 to the pneumatic shut-off valve 20 of FIGURE 1, not shown in FIGURE 2.

Adjusting cap 42 is adjusted to provide cream at a certain rate and at a certain percent butterfat and is locked in position by lock nut 43. Bleed conduit 44 permits the cream to pass from inner cream chamber 33 to milk outlet 35 continuously during operation. The inner chamber 33 would cause the cream to churn because of the rotation of shaft 36, if there was no bleed off means. The volume of this flow is controlled by bleed valve 45.

In the normal processing system, before the present invention, valve 38 and bleed valve 45 would have to be adjusted for each individual run of raw milk. This is a manual trial-and-error type adjustment which was time consuming and did not lend itself well to accurate production of processed milk.

The present invention permits an initial setting of the processing system and only requires manual setting of the timing clock 28 for each run which is accomplished easily and provides accurate processing results.

Figure 3:
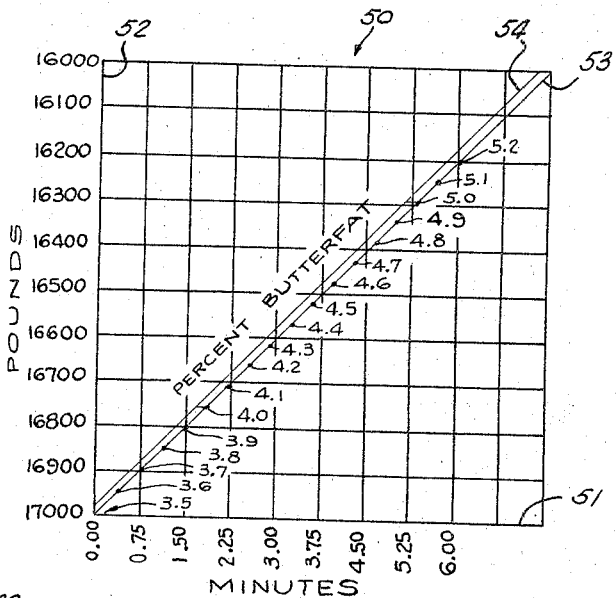
FIGURE 3 is a chart showing the necessary readings to set the timer unit which controls the cream outlet opening on the clarifier-standardizer unit.

A few examples will be given showing the operation of this processing system. Readings will be taken off the graph 50 shown in FIGURE 3. The processing system is set up to run 17,000 pounds of raw milk per hour. In the illustrated processing system, when the pneumatic shut-off valve 20 is open, the cream will be removed from the clarifier-standardizer at a rate of 800 pounds of cream per hour, having a 40% butterfat content, which equals 13⅓ pounds of cream per minute. Raw milk will normally be delivered to the creamery having a butterfat range between 3.6% and 4.2%. A normal requirement for whole milk is a minimum butterfat content of 3.5%. Therefore, if milk was received from the producer having 3.5% butterfat, the milk would merely be run through the clarifier-standardizer with no cream or butterfat being removed. As more butterfat is present in the milk, it would require more cream to be removed so as to have the processed raw milk reach the minimum permitted butterfat percent content.

The X-axis 51 represents the timer setting of a six-minute timing clock. The Y-axis 52 represents the pounds of processed raw milk produced per hour. The graph line 53 represents the percent of butterfat in the raw milk being processed. The theoretical graph line 53 is set up for a specific system and will process milk exactly at 3.5% butterfat content. In order to provide a margin of safety so as to be above the minimum percentage of butterfat required, a safety graph line 54 is provided which causes somewhat less cream to be removed from the raw milk than the theoretical graph line 53 requires, thus assuring the processed milk to be above the minimum 3.5% butterfat specification.

EXAMPLE 1

*Theoretical graph line calculation*

If raw milk is supplied having 5% butterfat, the reading off theoretical graph line 53 for the timing clock setting is indicated as 5.27 minutes. If the timing clock 28 is thus set, it would act on the solenoid valve 27 causing the pneumatic valve 25 to open the pneumatic shut-off valve 20, 5.27 minutes of each six-minute period. If the system worked for one hour the pneumatic shut-off valve 20 would be open 52.7 minutes and would remove 702.5 pounds of cream per hour having 281 pounds of butterfat.

The raw milk is pumped to the clarifier-standardizer 14 at the rate of 17,000 pounds per hour. This raw milk contains 850 pounds of butterfat. This will cause 702.5 pounds of cream having 281 pounds of butterfat to be removed per hour to the cream receiver. 16,297.5 pounds of processed milk will be produced per hour. This processed milk contains 529 pounds of butterfat, which equals 3.491% butterfat for the processed milk.

*Safety graph line calculation*

The safety line will be .1 of a minute less than the position on the theoretical line for each reading corresponding to the reading on graph line 53. Therefore, during a 5% butterfat raw milk run, the timing clock 28 will be set at 5.17 minutes. This will permit the pneumatic shut-off valve to remain open 51.7 minutes during each hour. This will cause 689.2 pounds of cream having 275.7 pounds of butterfat to be removed per hour to the cream receiver. 16,310.8 pounds of processed milk will be delivered through conduit 15.

The raw milk will have 850 pounds of butterfat per hour, with 275.7 pounds of butterfat being removed; therefore, the processed milk will contain 574.3 pounds of butterfat which equals 3.521% butterfat in the processed milk.

EXAMPLE 2

*Theoretical graph line calculation*

After the raw milk having 5% butterfat has been processed, the next load may come in and may be raw milk having 4% butterfat. Under these conditions the timing clock setting from the graph 50 would be 1.75 minutes. This would cause the pneumatic shut-off valve 20 to be open 17.5 minutes during each hour, thus removing 233.3 pounds of cream per hour having 93.3 pounds of butterfat. The raw milk will be pumped to the clarifier-standardizer at the same rate as before or 17,000 pounds per hour. This will cause 680 pounds of butterfat to be brought to the clarifier-standardizer 14 per hour. The cream receiver 23 will receive 233.3 pounds of cream, and 16,766.7 pounds of processed raw milk will be produced having 586.7 pounds of butterfat which equals 3.499% of butterfat.

*Safety graph line calculation*

As stated above, the safety graph line will reduce the amount of time the pneumatic shut-off valve 20 is open each six minutes by .1 of a minute. Therefore, the timing clock 28 would be set at 1.65 minutes. This would cause the pneumatic shut-off valve to be open 16.5 minutes per hour. This would remove 219.9 pounds of cream with 88.0 pounds of butterfat per hour. The processed milk produced would be 16,793.4 pounds per hour having 597.4 pounds of butterfat. The processed raw milk will have 3.528% butterfat.

The timing clock can be made to operate for any time period range; for example, a five-minute timing clock, a twelve-minute timing clock, a fifteen-minute timing clock, et cetera, could be used. Once a processing system is set up, the timing clock 28 would be the only adjustment needed for the various supplies of raw milk. This will speed up the processing time, increase the accuracy of the processing system, and stabilize the reliability of the processing system, and it reduces the creamery cost by providing milk close to the minimum butterfat percentage required. These are a few of the advantages as a result of this processing system.

It will be seen from the above that simple and inexpensive yet practical and durable means have been disclosed for obtaining the desired ends. It can be seen that the disclosed invention utilizes standard equipment presently available to increase the usefulness of equipment already in operation. Attention is again invited, however, to the possibility of making variations within the spirit and scope of the invention set forth and still be within the disclosed invention.

Other modes of applying the principle of my invention may be employed, instead of those explained, change being made as regards to the apparatus herein disclosed, provided the features stated by any of the following claims or the equivalent of such stated features be employed.

I therefore particularly point out and distinctly claim as my invention:

1. An extractor system adapted to process a supplied material and remove a first product containing a first material from the supplied material while leaving a controlled portion of the first material in the processed supplied material having, in combination
   (a) an extractor unit as part of said system to separate said first product having substantially a given percentage of said first material from said supplied product,
   (b) first and second outlet means as part of said extractor unit,
   (c) said first outlet means to remove said processed supplied product from said extractor,
   (d) said second outlet means to remove said first product from said extractor,
   (e) a control means to open and close said outlet means while said extractor is operating,
   (f) a bleed means connecting said first and second outlet means,
   (g) a timing clock as part of said control means, and
   (h) said timing clock timing the opening and closing of said second outlet means.

2. An extractor system according to claim 1, having
   (a) said bleed means remaining in an adjustable fixed open position continuously bleeding a portion of said first product into said processed supplied product.

3. An extractor system according to claim 2, having
   (a) said timing clock with a specific time cycle, and
   (b) said timing clock opening said second outlet means for a specific period of its time cycle and closing said second outlet means for the remaining period of its time cycle.

4. A dairy installation adapted to remove cream containing butterfat from raw milk to produce processed raw milk so that a required amount of butterfat percentage remains in the processed raw milk, the same comprising, in combination
   (a) a clarifier-standardizer to separate cream at substantially a given butterfat percentage from said raw milk,
   (b) a processed milk removal means to remove said processed raw milk from said clarifier-standardizer,
   (c) a cream removal means to remove said cream from said clarifier-standardizer,
   (d) a control means to open and close said cream removal means while said dairy installation is operating,
   (e) a bleed means in said clarifier-standardizer connecting said processed milk removal means and said cream removal means to continuously bleed portion of said cream into said processed raw milk,
   (f) a timing clock as part of said control means, and
   (g) said timing clock timing the opening and closing of said cream removal means.

5. A dairy installation according to claim 4, having in combination
   (a) said timing clock with a specific time cycle, and
   (b) said timing clock opening said cream removal means for a specific period of its time cycle and closing said cream removal means for the remaining period of its time cycle.

6. A dairy installation according to claim 5, having in combination
   (a) said timing clock cycle to repeat continuously while said dairy installation is operating.

7. An extractor system with a clarifier-standardizer unit adapted for extracting cream containing a portion of butterfat from raw milk to produce a quality of processed milk containing substantially a given percent of butterfat, comprising in combination
   (a) a raw milk storage source,
   (b) a first conduit and supply means to supply said raw milk from said storage source to said clarifier-standardizer,
   (c) cream and processed milk outlets as part of said clarifier-standardizer,
   (d) a cream receiver to receive said cream and a processed milk tank to receive said processed raw milk,
   (e) second and third conduits as part of said extractor system,
   (f) said second conduit connecting said milk outlet and said processed milk tank,
   (g) said third conduit having a shut-off valve and connecting said cream outlet and said cream receiver,
   (h) a control means to open and close said shut-off valve of the third conduit,
   (i) a timing clock as part of said control means, and
   (j) said timing clock timing the opening and closing of said shut-off valve.

8. An extractor system according to claim 7 including, in combination
   (a) said timing clock having a specific time cycle which continuously repeats while said extractor system is operating, and
   (b) said timing clock opening said shut-off valve for a specific period of its time cycle and closing said shut-off valve for the remaining period of its time cycle.

9. An extractor system according to claim 8 including in combination
   (a) inner and outer cream chambers as part of said cream outlet means,
   (b) said outer cream chamber being connected to said third conduit and said inner cream chamber,
   (c) said inner cream chamber initially receiving the cream from said clarifier-standardizer's extraction system, and
   (d) a bleed conduit having a bleed valve connecting said inner cream chamber and said milk outlet.

References Cited

UNITED STATES PATENTS

| | | | |
|---|---|---|---|
| 2,174,169 | 9/1939 | Risberg | 233—21 |
| 2,542,456 | 2/1951 | Ayres | 233—19 |
| 2,628,023 | 2/1953 | Dahlstedt | 233—19 |
| 2,725,186 | 11/1955 | Strezynski | 233—19 |
| 2,761,618 | 9/1956 | Fitzsimmons | 233—19 |
| 3,217,981 | 11/1965 | Johnsen | 233—19 |
| 3,239,137 | 3/1966 | Wenger | 233—20 |

M. CARY NELSON, *Primary Examiner.*

H. T. KLINKSIEK, *Examiner.*